March 26, 1957 H. T. LYMAN 2,786,945

WIDE RANGE RADIO FREQUENCY TUNER

Filed June 21, 1954

Inventor
Harold T. Lyman
By Ooms, McDougall, Williams + Hersh
Att'ys

United States Patent Office 2,786,945

Patented Mar. 26, 1957

2,786,945

WIDE RANGE RADIO FREQUENCY TUNER

Harold T. Lyman, Milford, Conn., assignor to Aladdin Industries, Incorporated, Nashville, Tenn., a corporation of Illinois Application June 21, 1954, Serial No. 438,045

4 Claims. (Cl. 250—40)

This invention relates to radio frequency tuners, particularly those adapted to cover extremely wide frequency ranges at very high and ultrahigh frequencies.

One proncipal object of the invention is to provide an improved radio frequency tuner adapted to tune over an extremely wide frequency range so as to cover, for example, the commercial television frequencies between 54 and 890 megacycles.

A further object is to provide a wide range radio frequency tuner of the foregoing character which will have an extremely high factor of merit, or "Q," throughout its tuning range and particularly at the upper end of the frequency range covered by the tuner.

It is another object of the invention to provide a tuner which acts as a variable inductance coil at relatively low frequencies and as a tunable cavity resonator at relatively high frequencies, the changeover from coil resonance to cavity resonance being effected smoothly and without any band switching.

A further object is to provide an improved wide range radio frequency tuner of the foregoing character affording two ungrounded energy transfer terminals so that the tuner will be especially well adapted for use in oscillator circuits or the like.

Figure 2:
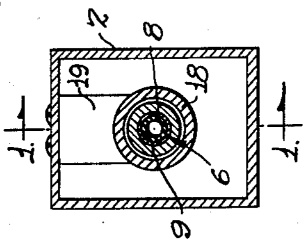
Figure 3:
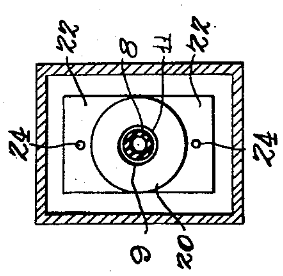
Figure 1:
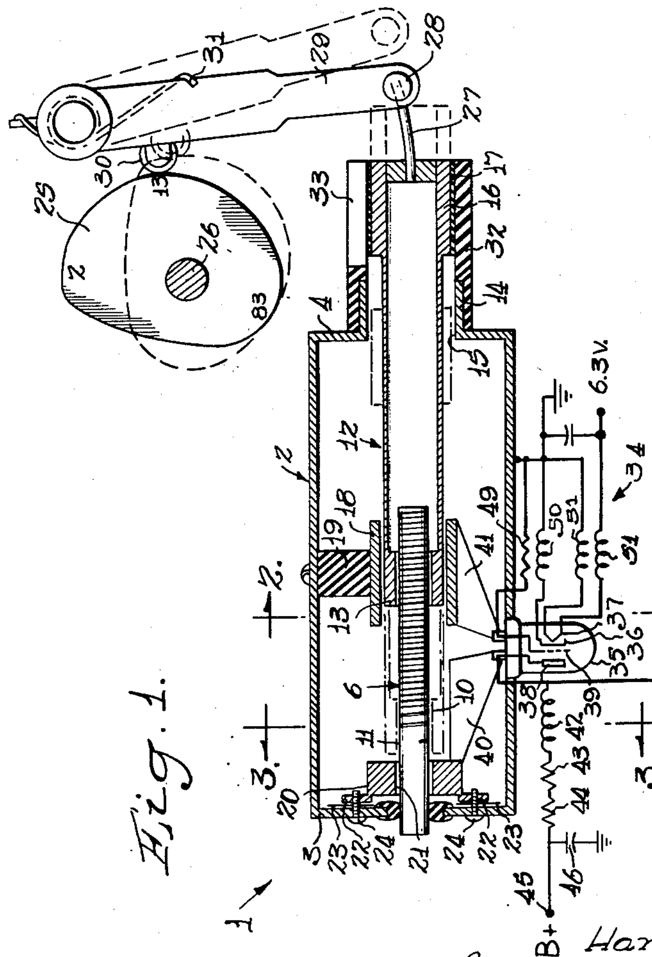
Figure 4:
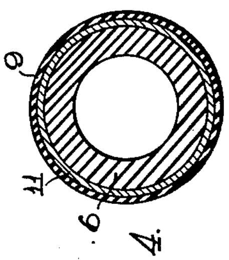

Further objects and advantages of the invention will appear from the following description, taken with the accompanying drawing, in which:

Figure 1 is a longitudinal sectional view of a purely illustrative radio frequency tuner embodying the invention, the view being taken generally along a line 1—1 in Fig. 2;

Figs. 2 and 3 are transverse sectional views taken along lines 2—2 and 3—3 in Fig. 1; and Fig. 4 is an enlarged cross-sectional view of a coil embodied in the tuner of Fig. 1.

Considered in greater detail, Fig. 1 illustrates a radio frequency tuner 1 which is adapted to cover an extremely wide frequency range, such as the range from 54 to 890 megacycles. This particular range embraces the V. H. F. (very high frequency) commercial television band from 54 to 216 megacycles and the U. H. F. (ultra high frequency) commercial television band from 470 to 890 megacycles.

To cover the upper portion of its frequency range, the tuner is provided with an elongated, conductive metallic housing 2 which acts as a re-entrant quarter wave cavity resonator at frequencies near 890 megacycles. The illustrated resonator housing 2 is rectangular in cross section, as shown in Figs. 2 and 3, and is provided with opposite end walls 3 and 4.

In order to provide for resonance at relatively low frequencies, a coil 6 is disposed axially within the housing 2. The coil 6 may be composed of metal deposited or otherwise formed in a generally helical pattern on an insulating tubular support 8 (Figs. 2 and 3). Photographic circuit printing techniques or the like may advantageously be employed in forming the coil 6, although the coil may also be formed by more conventional mechanical methods such as by winding metallic ribbon on the tubular form 8. A thin layer 9 of a low-loss dielectric material may be applied over the coil 6 to insulate and protect the coil, the layer being so thin as to be transparent. One end portion 10 of the coil 6 is connected in this instance to a continuous cylindrical metallic extension 11 carried on the form 8 in coaxial relation to the coil.

The tuner 1 is tuned by means of an elongated energy transfer element 12 arranged so that relative movement may take place between the tuning element and the housing 2. While the energy transfer element 12 may assume various forms, it is shown as an elongated sleeve adapted to be telescopically received over the coil 6 in the cylindrical extension 11.

The illustrated tuning sleeve 12 has a left hand end portion 13 which is narrowed down internally so as to have a fairly close sliding fit with the coil 6. While the sleeve 12 might in some cases be in direct conductive engagement with the coil 6, it is preferable to insulate the coil from the sleeve to afford capacitive energy interchange between these elements. In this instance, the insulating coating 9 provides the desired insulation, but it will be understood that the insulation may be applied to the inner surface of the sleeve or may be supplied by an air gap between the sleeve and the coil 6.

For the upper portion of the tuning range of the tuner 1, a variable capacitance is provided between the tuning sleeve 12 and the resonator housing by means of an energy transfer element 14. In this instance, the transfer element 14 takes the form of a ring or sleeve mounted in alinement with an axial aperture 15 formed in the end wall 4 of the housing 2. In this instance, the sleeve 14 is in direct conductive energy transfer relation with the end wall 4.

The sleeve 12 has an extreme right hand end portion 16 which is enlarged to have a fairly close sliding fit with the energy transfer ring 14. Insulation 17 is provided between the sleeve 12 and the ring 14. Preferably, the insulation 17 takes the form of a low-loss dielectric coating applied to the outside of the enlarged portion 16 of the sleeve 12. The insulation 17 provides for capacitive energy transfer between the ring 14 and the sleeve 12 when the sleeve is moved to the left to bring the enlarged end portion 16 into alinement with the ring 14. The ring 14 thus serves to couple the sleeve 12 to the cavity end wall 4 at the upper end of the tuning range of the tuner 1.

To provide for energy transfer to the tuning sleeve 12 a second energy transfer element 18 is disposed adjacent the sleeve 12 and in spaced relation to the energy transfer ring 14. In this instance the transfer element 18 takes the form of an elongated coupling ring or sleeve supported in the housing 2 by means of an insulating member 19. Throughout the range of relative movement between the sleeve 12 and the housing 2, at least a portion of the sleeve is always within the energy transfer ring 18 and, hence, is capacitively coupled to the ring.

Provision is made for transferring energy to and from one end of the coil 6. While it might be possible in some cases to connect a lead directly to the coil 6, it is preferred to employ a capacitive energy transfer element 20 which may assume various forms, but is shown as a conductive metallic ring encircling the metallic cylinder 11 extending from the end portion 10 of the coil. The coating 9 on the coil affords insulation between the cylinder 11 and the ring 20. In addition, an air gap 21 is provided between these elements.

To provide for energy interchange between the coupling ring 20 and the resonator housing 2, capacitive coupling elements 22 are connected to the ring 20. In this instance, the elements 22 assume the form of flanges or plates mounted on the ring and disposed in closely spaced relation to the end wall 3. A sheet or film 23 of a low-loss dielectric material, such as mica, for example, is preferably interposed between the plates 22 and the end wall 3. Screws 24 made of an insulating material are employed to secure the plates 22 to the end wall 3 and to adjust the spacing between the plates and the end wall. In this way, the capacitive coupling between the ring 20 and the cavity housing 2 may be adjusted.

Provision is made for effecting relative movement between the tuning sleeve 12 and the resonator housing 2. In this instance, the sleeve 12 is adapted to be moved along the coil 6 by means of a cam 25 mounted on a rotatable control shaft 26. A flexible insulating rod 27 is employed to connect a sleeve 12 to a pivot 28 mounted on a cam follower arm 29 which carries a roller 30 adapted to follow the cam 25. A spring 31 is employed to bias the arm 29 in one direction so as to hold the roller 30 against the cam 25. It will be understood that any desired number of cams may be mounted on the control shaft to operate a number of tuners in common.

An insulating tube 32 may be mounted on the enlarged portion 16 of the sleeve 12. A longitudinal slot 33 may be formed in the guide tube 32 to admit the arm 29.

While the tuner 1 has many applications to various types of circuits, it is particularly well adapted for use in circuits requiring a tuner having a pair of ungrounded terminals across which the tuner provides a resonant circuit. The rings 18 and 20 provide the two ungrounded terminals.

In Fig. 1, the tuner 1 is shown connected into an oscillator circuit 34 which may be employed in the frequency conversion section of a radio receiver, for example. The oscillator 34 utilizes a triode electron discharge tube 35 having a cathode 36, a cathode heater 37, an anode 38, and a grid 39. Wide ribbon leads 40 and 41 may be employed to connect the anode 38 and the grid 39 to the rings 20 and 18, respectively. Operating voltage is supplied to the anode 38 by means of an aperiodic choke 42 and resistors 43 and 44 connected in series between the anode and a terminal 45 representing a source of positive anode supply potential. A bypass capacitor 46 may be connected between the terminal 45 and ground. Energy may be transferred from the anode 38 to an output terminal 47 by means of a coupling capacitor 48. A grid biasing resistor 49 is connected between the grid 39 and ground, in this instance.

In order that the cathode 36 may float above ground potential, an aperiodic choke 50 is connected between the cathode and ground. Likewise, aperiodic chokes 51 are connected in series with the heater 37.

When the sleeve 12 is in the full-line position shown in Fig. 1, the tuner 1 is tuned to an intermediate point in its frequency range. The enlarged portion 16 of the sleeve 12 is withdrawn outwardly from the ring 14, with the result that the impedance between the sleeve 12 and the housing 2 is low. The portion of the coil 6 within the sleeve 12 is capacitively coupled to the sleeve and the sleeve, in turn, is capacitively coupled to the energy transfer ring 18. At the other end of the coil, the terminal cylinder 11 is capacitively coupled to the ring 20. Thus, the portion of the coil between the ring 20 and the sleeve 12 is effectively connected between the anode 38 and the grid 39 of the oscillator tube 35. It will be understood that the coil 6 is resonated by the capacitance between the anode 38 and the grid 39, together with various distributed capacitances between such elements of the tuner 1 as the coil 6, the sleeve 12, and the rings 18 and 20. The capacitance between the ring 20 and the housing 2 serves to regulate the ratio between the radio frequency anode and grid voltages.

When the sleeve 12 is moved to the right to the dotted-line position shown in Fig. 1, the entire coil 6 is effectively connected between the rings 18 and 20. Thus, this position represents the low frequency end of the tuning range provided by the tuner 1.

When the sleeve 12 is moved to the left into the position indicated by dot-dash lines in Fig. 1, the tuner is adjusted to the upper frequency end of its tuning range. In this position, the entire coil 6 and a portion of the terminal cylinder 11 are enveloped by the sleeve 12. Thus, the coil 6, is rendered inactive. The sleeve 12 is largely within the resonator housing 2, but extends part way into the ring 14. In this position of the sleeve 12, the housing 2 resonates as a quarter wave re-entrant cavity, loaded by the effective capacitance between the end walls 3 and 4. The capacitance between the end walls 3 and 4 is made up of the capacitances between the ring 14 and the sleeve 12, between the sleeve 12 and the terminal cylinder 11, between the terminal cylinder 11 and the ring 20, and between the ring 20 and the end wall 3, all connected in series. The sleeve 12 and the terminal cylinder 11 together form an axial post extending into the cavity resonator 2 between the end walls 3 and 4. Radio frequency voltage appears between the rings 18 and 20 because of their spaced relation along the axis of the resonator housing 2.

Movement of the sleeve 12 to the right from the dot-dash line position, shown in Fig. 1, moves the sleeve farther into the ring 14 and thereby increases the capacitances between the ring and the sleeve. The resonant frequency of the housing 2 is thereby correspondingly decreased. Further movement of the sleeve 12 exposes the left hand end portion 10 of the coil 6 and moves the enlarged portion 16 of the sleeve out of the ring 14. Accordingly, there is a gradual shift from cavity resonance to coil resonance.

The sleeve 12 has a heavy loading effect upon the portion of the coil enveloped by the sleeve. Accordingly, the sleeve largely prevents the occurrence of objectionable spurious resonances in the inactive portion of the coil 6.

It will be apparent that the factor of merit, or Q, of the tuner 1 is maintained at a high value throughout its tuning range. This is largely due to the fact that the tuner behaves as a cavity resonator in the high frequency portion of the tuning range.

It has been found that the tuner will provide smooth continuous coverage of the V. H. F. and U. H. F. commercial television bands without any noticeable tuning discontinuities or spurious resonances within these bands. In all parts of the bands, the output of the oscillator is maintained at a high level.

Various other modifications, alternative constructions, and equivalents may be employed without departing from the true spirit and scope of the invention as disclosed in the drawing and the foregoing specification and defined in the following claims.

I claim:

1. In a wide range radio frequency tuner, the combination comprising a conductive housing for resonating as a cavity, said housing having first and second opposite end walls, a conductive post having one end adjacent said first end wall, said post extending part way toward said second end wall, a first generally annular coupling electrode in adjacent capacitively coupled relation to both said first end wall and said post, a coil having one end connected to said post and extending therefrom in alignment therewith toward said second end wall, a conductive tuning sleeve movable telescopically over said post and said coil, said sleeve enveloping said coil and at least a portion of said post with said sleeve in a first position, said sleeve in said first position being in closely adjacent energy-exchange relation to said post and effectively constituting an adjustable extension thereof, said sleeve being movable along said post toward said second end wall to a second position and thereby effectively lengthening said post and progressively decreasing the resonant frequency of said tuner with said housing effectively constituting a cavity resonator, a generally annular capacitive tuning electrode connected to said second end wall and aligned with said sleeve, said sleeve having an enlarged portion received in said tuning electrode in capacitive energy-exchange relation thereto with said sleeve at said second position, said sleeve extending between said post and said tuning electrode at said second position, said sleeve progressively entering said tuning electrode and thereby increasing the capacitance therebetween in the course of movement of said sleeve between said first and second positions, said sleeve and said tuning electrode thereby cooperating to reduce the resonant frequency of said tuner as a cavity resonator, said sleeve being movable beyond said second position to a third position with a portion of said coil uncovered by said sleeve, said sleeve progressively uncovering said coil in the course of movement of said sleeve between said second and third positions, said sleeve thereby progressively introducing the inductance of said coil into said tuner and further reducing the resonant frequency thereof, and a second generally annular coupling electrode disposed in said housing and received around said sleeve in energy-exchange relation thereto throughout the range traversed by said sleeve in moving between said first and third positions.

2. In a wide range radio frequency tuner, the combination comprising a conductive housing for resonating as a cavity, said housing having first and second opposite end walls, a conductive post having one end adjacent said first end wall, said post extending part way toward said second end wall, a first generally annular coupling electrode in adjacent capacitively coupled relation to both said first end wall and said post, a coil having one end connected to said post and extending therefrom in alignment therewith toward said second end wall, a conductive tuning sleeve movable telescopically over said post and said coil, said sleeve enveloping said coil and at least a portion of said post with said sleeve in a first position, said sleeve in said first position being in closely adjacent energy-exchange relation to said post and effectively constituting an adjustable extension thereof, said sleeve being movable along said post toward said second end wall to a second position and thereby effectively lengthening said post and progressively decreasing the resonant frequency of said tuner with said housing effectively constituting a cavity resonator, a generally annular capacitive tuning electrode in energy-exchange relation with said second end wall and aligned with said sleeve, said sleeve having a portion received in said tuning electrode in energy-exchange relation thereto with said sleeve at said second position, said sleeve extending between said post and said tuning electrode at said second position, said sleeve progressively entering said tuning electrode and thereby increasing the capacitance therebetween in the course of movement of said sleeve between said first and second positions, said sleeve and said tuning electrode thereby cooperating to reduce the resonant frequency of said tuner as a cavity resonator, said sleeve being movable beyond said second position to a third position with a portion of said coil uncovered by said sleeve, said sleeve progressively uncovering said coil in the course of movement of said sleeve between said second and third positions, said sleeve thereby progressively introducing the inductance of said coil into said tuner and further reducing the resonant frequency thereof, and a second generally annular coupling electrode received around said sleeve in energy-exchange relation thereto throughout the range traversed by said sleeve in moving between said first and third positions.

3. In a wide range radio frequency tuner, the combination comprising a conductive housing for resonating as a cavity, said housing having first and second opposite end walls, a conductive post having one end adjacent said first end wall, said post extending part way toward said second end wall, means establishing a capacitively coupled relation between said first end wall and said post, a coil having one end connected to said post and extending therefrom toward said second end wall, a conductive tuning sleeve movable telescopically over said post and said coil, said sleeve enveloping said coil and at least a portion of said post with said sleeve in a first position, said sleeve in said first position being in energy-exchange relation to said post and effectively constituting an adjustable extension thereof, said sleeve being movable along said post toward said second end wall to a second position and thereby effectively lengthening said post and progressively decreasing the resonant frequency of said tuner, a capacitive tuning electrode in energy-exchange relation with said second end wall, said sleeve being adjacent said tuning electrode in energy-exchange relation thereto with said sleeve at said second position, said sleeve extending between said post and said tuning electrode at said second position, said sleeve progressively overlapping said tuning electrode and thereby increasing the capacitance therebetween in the course of movement of said sleeve between said first and second positions, said sleeve and said tuning electrode thereby cooperating to reduce the resonant frequency of said tuner, said sleeve being movable beyond said second position to a third position with a portion of said coil uncovered by said sleeve, said sleeve progressively uncovering said coil in the course of movement of said sleeve between said second and third positions, said sleeve thereby progressively introducing the inductance of said coil into said tuner and further reducing the resonant frequency thereof, and a coupling electrode adjacent said sleeve in energy-exchange relation thereto through the range traversed by said sleeve in moving between said first and third positions.

4. In a wide range radio frequency tuner, the combination comprising a conductive housing for resonating as a cavity, said housing having first and second opposite end walls, a conductive post having one end adjacent said first end wall, said post extending part way toward said second end wall, means establishing a capacitively coupled relation between said first end wall and said post, a coil having one end connected to said post and extending therefrom toward said second end wall, a conductive tuning sleeve movable telescopically over said post and said coil, said sleeve enveloping said coil and at least a portion of said post with said sleeve in a first position, said sleeve in said first position being in energy-exchange relation to said post and effectively constituting an adjustable extension thereof, said sleeve being movable along said post toward said second end wall to a second position and thereby effectively lengthening said post and progressively decreasing the resonant frequency of said tuner, a capacitive tuning electrode in energy-exchange relation with said second end wall, said sleeve being adjacent said tuning electrode in energy-exchange relation thereto with said sleeve at said second position, said sleeve extending between said post and said tuning electrode at said second position, said sleeve progressively overlapping said tuning electrode and thereby increasing the capacitance therebetween in the course of movement of said sleeve between said first and second positions, said sleeve and said tuning electrode thereby cooperating to reduce the resonant frequency of said tuner, said sleeve being movable beyond said second position to a third position with a portion of said coil uncovered by said sleeve, said sleeve progressively uncovering said coil in the course of movement of said sleeve between said second and third positions, said sleeve thereby progressively introducing the inductance of said coil into said tuner and further reducing the resonant frequency thereof.

References Cited in the file of this patent

UNITED STATES PATENTS

| | | |
|---|---|---|
| 2,247,212 | Trevor | June 24, 1941 |
| 2,465,102 | Joy | Mar. 22, 1949 |
| 2,641,708 | Carlson | June 9, 1953 |